(12) United States Patent
Yamamoto

(10) Patent No.: US 8,313,796 B2
(45) Date of Patent: Nov. 20, 2012

(54) METHOD FOR MANUFACTURING POSITIVE ELECTRODE OF NONAQUEOUS ELECTROLYTE SECONDARY BATTERY

(75) Inventor: Satoshi Yamamoto, Tokushima (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 51 days.

(21) Appl. No.: 12/962,976

(22) Filed: Dec. 8, 2010

(65) Prior Publication Data

US 2011/0159172 A1    Jun. 30, 2011

(30) Foreign Application Priority Data

Dec. 25, 2009  (JP) ................................. 2009-295866

(51) Int. Cl.
*B05D 5/12* (2006.01)
(52) U.S. Cl. .................... 427/77; 427/126.1; 427/126.3; 427/126.4
(58) Field of Classification Search ............... 427/249.1, 427/255.31, 255.36, 162, 166, 77, 126.1, 427/126.3, 126.4
See application file for complete search history.

(56) References Cited

U.S. PATENT DOCUMENTS

| | | | | |
|---|---|---|---|---|
| RE29,812 E * | 10/1978 | Jordan et al. | .................. | 136/258 |
| 7,147,968 B2 * | 12/2006 | Han et al. | ................... | 429/218.1 |
| 7,662,516 B2 * | 2/2010 | Fukunaga et al. | ............ | 429/232 |
| 2004/0197667 A1 * | 10/2004 | Noh et al. | ..................... | 429/326 |
| 2005/0106460 A1 * | 5/2005 | Otsuki et al. | .................. | 429/224 |
| 2005/0208380 A1 * | 9/2005 | Park et al. | ...................... | 429/232 |
| 2006/0115730 A1 * | 6/2006 | Taniguchi et al. | ............ | 429/217 |
| 2006/0222952 A1 * | 10/2006 | Kono et al. | ............... | 429/231.95 |
| 2007/0204458 A1 * | 9/2007 | Fujita et al. | ................... | 29/623.1 |
| 2007/0224497 A1 * | 9/2007 | Harada et al. | ................. | 429/144 |
| 2008/0057396 A1 * | 3/2008 | Fujihara et al. | ............... | 429/212 |
| 2008/0241646 A1 * | 10/2008 | Sawa et al. | ....................... | 429/94 |
| 2009/0053602 A1 * | 2/2009 | Sakitani et al. | ............... | 429/213 |
| 2009/0317718 A1 * | 12/2009 | Imachi et al. | ................. | 429/212 |

FOREIGN PATENT DOCUMENTS

JP    2009-043641 A    2/2009

OTHER PUBLICATIONS

Kim, Nam-In, et al., "Correlation between positive-electrode morphology and sulfur utilization in lithium-sulfur battery." Journal of Power Sources 132 (2004) 209-212.*

(Continued)

*Primary Examiner* — Bret Chen
(74) *Attorney, Agent, or Firm* — Westerman, Hattori, Daniels & Adrian, LLP

(57) ABSTRACT

A method for manufacturing a positive electrode for a nonaqueous electrolyte secondary battery includes forming an inorganic particle slurry layer formed on a surface of a positive electrode active material layer. The method includes forming a positive electrode active material layer on a surface of a positive electrode collector, and coating an inorganic particle slurry containing inorganic particles and carboxymethyl cellulose on a surface of the positive electrode active material layer and thereafter drying the slurry to form a porous inorganic particle layer. The inorganic particle slurry contains carboxymethyl cellulose having an etherification degree of 0.8 or more and a viscosity of 800 mPa·s or more in a 1% aqueous solution at a ratio of 0.2% by mass or more and 1.0% by mass or less with respect to the inorganic particles.

7 Claims, 2 Drawing Sheets

OTHER PUBLICATIONS

Lee, Jin-Hyon, et al., "Effect of Additives on the Dispersion Properites of Aqueous Based C/LiFePO4 paste and its Impact on Lithium Ion Battery High Power Properties." KONA Powder and Particle Journal No. 27 (2009), pp. 239-245.*

Porcher, W., et al., "Design of Aqueous Processed Thick LiFEPO4 Composite Electrodes for High-Energy Lithium Battery". Journal of the Electrochemical Society, 156 (3) A133-A144 (2009).*

* cited by examiner

METHOD FOR MANUFACTURING POSITIVE ELECTRODE OF NONAQUEOUS ELECTROLYTE SECONDARY BATTERY

TECHNICAL FIELD

The present invention relates to a method for manufacturing a positive electrode for a nonaqueous electrolyte secondary battery. In detail, the invention relates to a method for manufacturing a positive electrode for a nonaqueous electrolyte secondary battery capable of further improving battery safety by evenly forming an inorganic particle layer formed on a surface of a positive electrode active material layer.

BACKGROUND ART

Recently, downsizing and weight reduction of mobile information terminals such as cell phones and notebook computers have been developed rapidly, and thus the batteries that function as the operating power supply are required to have a much higher capacity. In particular, nonaqueous electrolyte secondary batteries represented by a lithium ion secondary battery are widely used as the operating power supply for mobile information terminals because they have a high energy density and high capacity. Power consumption of such mobile information terminals tends to be further increased when accompanied with enhanced functions such as video playback and games. Thus, the nonaqueous electrolyte secondary batteries that function as the operating power supply are strongly required to have a much higher capacity and higher performance for extended playback, output power improvement, and the like.

In such a background, in order to further improve the capacity of the nonaqueous electrolyte secondary battery, various studies have been carried out. For example, lithium nickel oxide having a higher capacity is used in place of lithium cobalt oxide that is commonly used as a positive electrode material of the nonaqueous electrolyte secondary battery, and the final charge voltage of the battery is increased to provide a higher capacity.

However, as the nonaqueous electrolyte secondary battery has a higher capacity and higher energy density, there is a problem regarding reduced battery safety. Hence, recently, in order to improve the battery safety (suppression of an internal short circuit), techniques are disclosed for forming a porous inorganic particle layer on a surface of a positive electrode active material layer or a surface of a negative electrode active material layer.

For example, JP-A-2009-43641 discloses a negative electrode for a nonaqueous electrolyte battery in which a negative electrode active material layer containing a negative electrode active material and an aqueous binding agent for a negative electrode active material layer is formed on a surface of a negative electrode collector. In the negative electrode for a nonaqueous electrolyte battery, a porous inorganic particle layer containing inorganic particles and a nonaqueous binding agent for a porous layer is formed on a surface of the negative electrode active material layer, and the binding agent for a negative electrode active material layer includes carboxymethyl cellulose (CMC) having an etherification degree of 0.5 or more and 0.75 or less.

As disclosed in JP-A-2009-43641, the porous inorganic particle layer formed on a surface of an active material layer in a negative electrode for a nonaqueous electrolyte battery is formed by coating the surface of the active material layer with an inorganic particle slurry that is prepared by mixing particles of an inorganic oxide such as titanium oxide and aluminum oxide with a solvent and a binder.

However, particles of submicron size generally have the characteristic of ready agglutination depending on the shape or the composition ratio of solvents. When a slurry containing aggregates caused by the agglutinating property is coated on the surface of an active material layer, the coated face becomes uneven and a part of the surface of the active material layer is exposed. Consequently, the exposed portion of the active material layer causes a short circuit when foreign matter having high conductivity (for example, a piece of a collector) is present, and thus the porous inorganic particle layer cannot function as an insulating layer.

Furthermore, because the particles of submicron size have a high specific surface area, it is difficult to prepare a solution or slurry that is stable and with excellent process efficiency. Therefore, the problem exists that when a solution or slurry containing particles of submicron size is coated on an active material layer, a safety improvement effect cannot be sufficiently obtained because the porous inorganic particle layer is coated unevenly.

SUMMARY

An advantage of some aspects of the invention is to provide a method for manufacturing a positive electrode for a nonaqueous electrolyte secondary battery that can further improve safety by evenly forming an inorganic particle slurry layer formed on a surface of a positive electrode active material layer.

According to an aspect of the invention, a method for manufacturing a positive electrode for a nonaqueous electrolyte secondary battery include forming a positive electrode active material layer on a surface of a positive electrode collector, and coating an inorganic particle slurry containing inorganic particles, CMC, and a binder on a surface of the positive electrode active material layer and thereafter drying the slurry to form a porous inorganic particle layer. The inorganic particle slurry contains CMC having an etherification degree of 0.8 or more and a viscosity of 800 mPa·s or more in a 1% aqueous solution at a ratio of 0.2% by mass or more and 1.0% by mass or less with respect to the inorganic particles.

With the method for manufacturing a positive electrode for a nonaqueous electrolyte secondary battery of the invention, viscosity and the settling property displaying agglutinating properties are suppressed in the inorganic particle slurry that is coated on the positive electrode active material layer in order to form the porous inorganic particle layer, and thus the coating can be performed evenly. Therefore, a positive electrode obtained by the method for manufacturing a positive electrode for a nonaqueous electrolyte secondary battery of the invention has sufficiently secured insulating properties, and a nonaqueous electrolyte secondary battery including the positive electrode provides further improved safety because an internal short circuit and the like can be prevented. The upper limit of the etherification degree of CMC is 1.4 because it is difficult to produce a CMC having an etherification degree of more than 1.4.

In the method for manufacturing a positive electrode for a nonaqueous electrolyte secondary battery of the invention, the inorganic particles preferably include an insulating inorganic oxide, and specifically preferably include at least one of titanium oxide and aluminum oxide.

Inorganic particles included in the inorganic particle slurry may be an insulating inorganic oxide such as titanium oxide, aluminum oxide, zinc oxide, and magnesium oxide. However, titanium oxide and aluminum oxide has a low reactivity with lithium, excellent stability in a nonaqueous electrolyte secondary battery, and is low in cost. Thus, applying the method for manufacturing a positive electrode for a nonaqueous electrolyte secondary battery of the invention, a positive electrode for a nonaqueous electrolyte secondary battery that has sufficiently secured insulating properties and that can provide further improved battery safety can be obtained at low cost.

In the method for manufacturing a positive electrode for a nonaqueous electrolyte secondary battery of the invention, the inorganic particle slurry preferably includes a binder at a content of 5% by mass or less with respect to the inorganic particles.

When the content of a binder is more than 5% by mass with respect to the inorganic particles, the permeation property of an electrolyte in the porous inorganic particle layer may be excessively decreased because the binder is densely filled, transfer of lithium ions is prevented between the positive and negative electrodes, and thus the battery performance may be significantly decreased.

In the method for manufacturing a positive electrode for a nonaqueous electrolyte secondary battery of the invention, the porous inorganic particle layer preferably has a thickness of 0.5 to 3.0 μm.

Because inorganic particles do not contribute to the electrode reaction, the amount of the positive electrode active material capable of being filled is decreased as the porous inorganic particle layer has a thickness of more than 3.0 μm, and thus the battery capacity may be decreased. When the porous inorganic particle layer has a thickness of less than 0.5 μm, the thickness of the porous inorganic particle layer is excessively thin, and thus the porous inorganic particle layer may have a smaller effect.

In the method for manufacturing a positive electrode for a nonaqueous electrolyte secondary battery of the invention, the inorganic particle slurry is coated on the surface of the positive electrode active material layer preferably by a gravure coating method.

Because the gravure coating method is specifically suitable for forming a thin film, the inorganic particle slurry can be thinly and evenly coated on the surface of the positive electrode active material layer. Therefore, with the method for manufacturing a positive electrode for a nonaqueous electrolyte secondary battery of the invention, in particular, even when the porous inorganic particle layer is formed on the surface of the positive electrode active material layer, the battery capacity is less decreased and a nonaqueous electrolyte secondary battery having high safety can be obtained.

In the method for manufacturing a positive electrode for a nonaqueous electrolyte secondary battery of the invention, it is preferable that the forming of the positive electrode active material layer on the surface of the positive electrode collector include coating a positive electrode active material slurry on the surface of the positive electrode collector and thereafter drying the slurry, that the positive electrode active material slurry be a dispersion slurry of a positive electrode active material in a nonaqueous solvent, and that the inorganic particle slurry be a dispersion slurry of the inorganic particles in water.

A positive electrode active material for a nonaqueous electrolyte secondary battery is deactivated when it is contact with water. Thus, when the solvent of the positive electrode active material slurry is a nonaqueous solvent, the characteristics of a positive electrode active material layer is less decreased, and when the solvent of the inorganic particle slurry is water, mixing of the positive electrode active material layer and the porous inorganic particle layer is suppressed when the porous inorganic particle layer is formed on the surface of the positive electrode active material layer. Thus, damage to the positive electrode active material layer can be minimized. In addition, with the nonaqueous electrolyte secondary battery of the invention, because the porous inorganic particle layer is evenly formed, a positive electrode plate having a surface with sufficiently secured insulating properties can be obtained. Therefore, a nonaqueous electrolyte secondary battery in which an internal short circuit and the like are suppressed and that has higher safety can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1B:
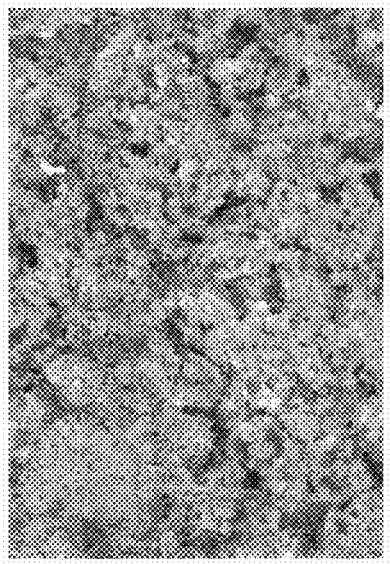
FIG. 1B is a scanning electron microscopic image of a surface of a porous inorganic particle layer of Comparative Example 5.

Exemplary embodiments of the invention will now be described in detail with reference to examples and comparative examples. It should be noted that the examples described below are illustrative examples of nonaqueous electrolyte secondary batteries for embodying the technical spirit of the invention and are not intended to limit the invention to these examples, and the invention may be equally applied to various modified cases without departing from the technical spirit described in the claims.

Preparation of Positive Electrode Active Material

Lithium carbonate ($Li_2CO_3$) was used as a lithium source for a starting material, and as a cobalt source, cobalt carbonate ($CoCO_3$) was burned at 550° C. for thermal decomposition and the obtained tricobalt tetraoxide ($CO_3O_4$) was used. Each was weighted so that the molar ratio of lithium and cobalt would be 1:1, and they were mixed in a mortar. The mixture was burned under air atmosphere at 850° C. for 20 hours. The obtained lithium cobalt oxide ($LiCoO_2$) was pulverized with a mortar until the average particle diameter reached 15 μm to provide lithium cobalt oxide powder as a positive electrode active material.

Preparation of Positive Electrode Plate

A mixture was prepared by mixing 96 parts by mass of the lithium cobalt oxide powder obtained as described above as a positive electrode active material, 2 parts by mass of carbon powder as a conductive material, and 2 parts by mass of polyvinylidene fluoride (PVDF) powder as a binding agent, and the mixture was dissolved and dispersed in N-methyl-2-pyrrolidone (NMP) to prepare a positive electrode active material slurry.

The slurry was evenly coated by using the doctor blade method on both sides of an aluminum collector having a thickness of 15 μm and a length of 625 mm so as to have a coated length of 550 mm (an uncoated length of 75 mm). Then, the coated aluminum collector was passed through a dryer for drying to remove NMP, and then compressed using a roll press so as to have a thickness of 175 µm to prepare a positive electrode plate used in each example and comparative example.

Preparation of Inorganic Particle Slurry

CMC having a predetermined composition and pure water were mixed with titanium oxide or aluminum oxide as inorganic particles so as to have a predetermined composition, and the whole was kneaded with a kneader (T.K. HIVIS MIX manufactured by PRIMIX Corporation). The obtained slurry was dispersed with a bead mill (a ball mill dispersion apparatus manufactured by ASADA IRON WORKS. CO., LTD.). The dispersion conditions were as follows: internal volume: 0.3 L; bead diameter: 0.5φ; slit: 0.15 mm; bead filling amount: 90%; peripheral speed: 40 Hz; and treatment flow rate: 1.0 kg/min. CREL (trade name: manufactured by ISHIHARA SANGYO KAISHA, LTD.) was used as titanium oxide in each of Examples 1 to 6 and Comparative Examples 1 to 5. AK3000 was used as aluminum oxide in Example 7, AKP20 was used in Example 8, and AKP30 was used in Example 9 (trade name: each manufactured by Sumitomo Chemical Co., Ltd.).

Then, a binder (acrylic rubber binder) was added at 3.75% by mass with respect to the inorganic particles, and pure water was further added to the obtained slurry so that the final ratio of the inorganic particles would be 25% by mass with respect to the total mass of the slurry. The slurry was kneaded once again with the kneader above to prepare an inorganic particle slurry used in each example and comparative example.

Measurement of Various Characteristics of Inorganic Particle Slurry

The following physical properties were measured on each inorganic particle slurry obtained above.

*Dispersion state: a laser diffraction particle size analyzer (SALD-2200 manufactured by Shimadzu Corporation).

*Viscosity: a spiral viscometer (PC-1LT manufactured by MALCOM), measurement condition: 40 rpm.

*Settling property of inorganic particles: Slurry was sealed in a cylindrical container having a diameter of 45 mm and a height of 80 mm and left at 25° C. for 3 days. Then, the thickness of a supernatant formed by separating the slurry was measured to determine the index of settling property.

*Stability: Slurry was poured into T.K. HIVIS MIX type 2P-1 and continuously agitated at 20 rpm for 12 hours. The increased viscosity of the slurry before and after the agitation was calculated to determine the index of stability.

As CMC, "1290" manufactured by Daicel Chemical Industries, Ltd. was used in Example 1, "1280" manufactured by Daicel Chemical Industries, Ltd. was used in Examples 2 and 3, "1380" manufactured by Daicel Chemical Industries, Ltd. was used in Examples 4 and 7 to 9, "1390" manufactured by Daicel Chemical Industries, Ltd. was used in Example 5, and "F800HC" manufactured by Nippon Paper Chemicals Co., Ltd. was used in Example 6. The viscosity and the etherification degree were previously measured on each CMC. The viscosity was measured on a prepared 1% aqueous solution with a B-type viscometer at 25° C. at 60 rpm. The etherification degree was measure by nitric acid-methanol method.

Formation of Porous Inorganic Particle Layer

Figure 1A:
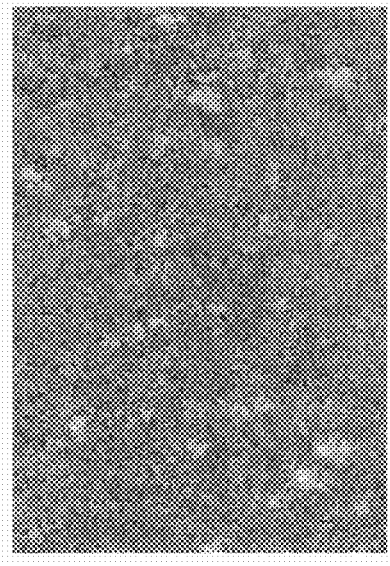
FIG. 1A is a scanning electron microscopic image of a surface of a porous inorganic particle layer of Example 4.

The inorganic particle slurry obtained as described above was coated on each surface of the positive electrode active material layers on both sides of the positive electrode plate by a gravure coating method to form a porous inorganic particle layer having a thickness of 2.0 µm. The surface state of the porous inorganic particle layer of each positive electrode plate used in Example 4 and Comparative Example 5 was observed under a scanning electron microscope. The results are shown in FIG. 1. FIG. 1A shows the result of Example 4, FIG. 1B shows the result of Comparative Example 5, and each magnification was 1500-fold.

Preparation of Negative Electrode Plate

With water, 97.5 parts by mass of graphite as a negative electrode active material, 1.0 part by mass of CMC as a thickener, and 1.5 parts by mass of styrene-butadiene rubber (SBR) as a binder were mixed to prepare a negative electrode active material slurry. The negative electrode active material slurry was evenly coated by using the doctor blade method on both sides of a copper collector having a thickness of 10 µm and a length of 650 mm so as to have a coated length of 590 mm (an uncoated length of 60 mm).

Then, the coated copper collector was passed through a dryer for drying, and then compressed with a roll press so as to have a thickness of 145 µm to prepare a negative electrode plate used in each example and comparative example.

The potential of lithiated graphite ($LiC_6$) was about 0.1 V based on Li. The coating amount of the active materials for each of the positive electrode plate and the negative electrode plate was controlled so that the charging capacity ratio at an opposing part of the positive electrode plate and the negative electrode plate (negative electrode charging capacity/positive electrode charging capacity) would become 1.0 to 1.1 at the charging voltage as the design standard.

Preparation of Nonaqueous Electrolyte

Ethylene carbonate (EC) and methyl ethyl carbonate (MEC) were mixed at a volume ratio of 30:70 (conversion under 1 atmosphere at 25° C.) to prepare a nonaqueous solvent. $LiPF_6$ as an electrolyte salt was dissolved at a ratio of 1.0 mol/L in the nonaqueous solvent to prepare a nonaqueous electrolyte used in each example and comparative example.

Preparation of Electrode Assembly

An aluminum positive electrode current collecting tab was welded to the positive electrode plate, and a nickel negative electrode current collecting tab was welded to the negative electrode plate. Then, the positive electrode plate and the negative electrode plate, each welded with the current collecting tab, were wound interposing a separator made of a polyethylene microporous membrane to prepare a spiral electrode assembly used in each example and comparative example.

Preparation of Battery

Insulating plates were placed on the top face and a bottom face of the electrode assembly obtained as described above and the whole was inserted into a cylindrical-shaped battery can. Next, the negative electrode lead wire was welded to the inner wall of the battery can, and the positive electrode lead wire was welded to a sealing plate. Then, the obtained nonaqueous electrolyte was poured into the battery can in a glove box filled with Ar, after which an insulating gasket was placed on the periphery of the sealing plate, and the battery was sealed to prepare a nonaqueous electrolyte secondary battery (a diameter of 18 mm, a height of 65 mm, 1 It=2000 mA) pertaining to each example and comparative example.

Figure 2:
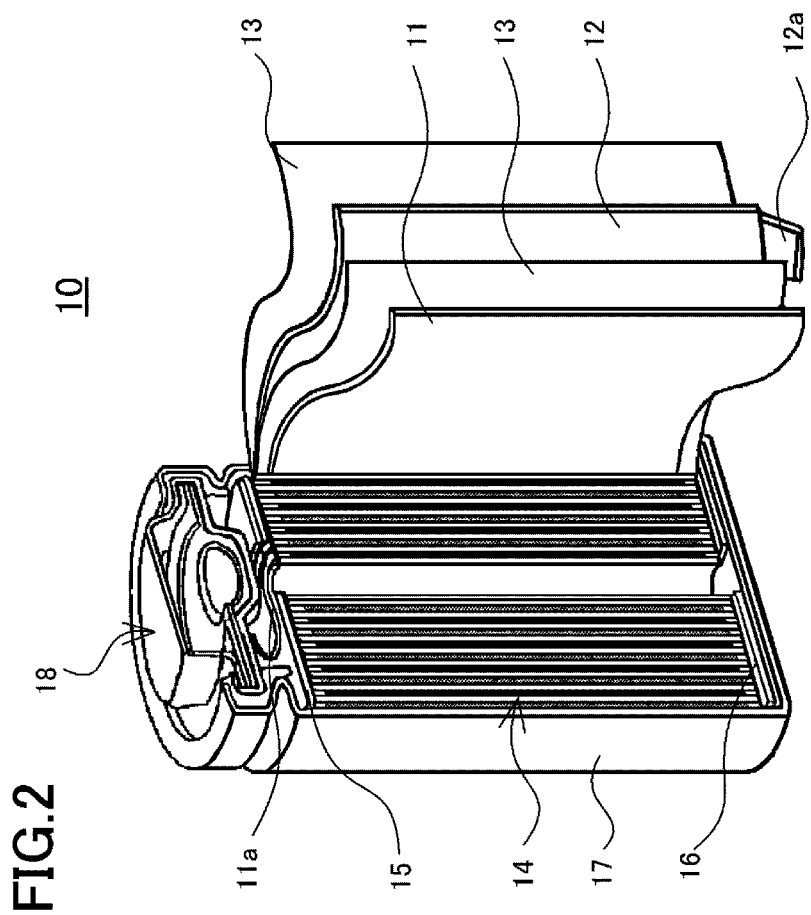
FIG. 2 is a perspective view showing a longitudinal section of a cylindrical-shaped nonaqueous electrolyte secondary battery used for measuring various types of battery characteristics in each example and comparative example.

FIG. 2 is a perspective view showing a longitudinal section of a cylindrical-shaped nonaqueous electrolyte secondary battery used in each example and comparative example. This nonaqueous electrolyte secondary battery 10 uses a rolled electrode assembly 14 formed by rolling a positive electrode 11 and a negative electrode 12 with a separator 13 interposed therebetween and has the following structure: insulting plates 15 and 16 are placed on upper and lower faces of the rolled electrode assembly 14, respectively. The rolled electrode assembly 14 is put into a cylindrical-shaped battery outer can 17 made of steel also serving as a negative electrode terminal. A current collecting tab 12a of the negative electrode 12 is welded on an inner bottom part of the battery outer can 17. A current collecting tab 11a of the positive electrode 11 is welded on a bottom plate part of a current interrupting sealing body 18 equipped with a safety apparatus. A predetermined nonaqueous electrolyte is poured from a mouth portion of the battery outer can 17, and the battery outer can 17 is sealed with the current interrupting sealing body 18.

Forced Internal Short Circuit Test

As described above, five batteries were prepared for each example and comparative example. Each battery was charged until the battery voltage reached 4.20 V, and then the battery outer can was disassembled to remove the electrode assembly. Then, an L-shaped nickel plate having a size of 2 mm×2 mm was inserted between the separator and the positive electrode plate, and the plate was pushed to cause a forced short circuit between the positive and negative electrodes. The forced short circuit test was carried out at an ambient temperature of 50° C. with the push pressure gradually increased from 1 N to 800 N, after which the number of burned electrode assemblies was counted. The results of the forced short circuit test are listed in Table 1 together with the measured various physical properties of the positive electrode inorganic particle slurry and CMC and the compounding ratio of CMC.

The comparison of Examples 1 and 6, and Comparative Example 3 reveals that, even when the compounding ratio of CMC is within the optimum range, the safety improvement effect is insufficient when CMC has an excessively low etherification degree, that is, when CMC has an etherification degree of 0.6 or less.

The comparison of Example 2, and Comparative Examples 1 and 2 reveals that, even when the compounding ratio of CMC is within the optimum range and CMC has an etherification degree of more than 0.6, the safety improvement effect is insufficient when CMC has an excessively low viscosity, that is, when CMC has a viscosity of 250 or less.

Therefore, in order to obtain a sufficient safety improvement effect, it is clear that CMC having an etherification degree of more than 0.6 and a viscosity of more than 250 is required to be selected when an inorganic particle slurry is prepared, and that the compounding ratio is required to be within 0.1 to 1.2% by mass with respect to the inorganic particles.

The comparison of Example 3 and Comparative Example 4 reveals that the compounding ratio of CMC is more preferably 1.0% by mass or less, the comparison of Example 6 and Comparative Example 5 reveals that the compounding ratio

TABLE 1

| | Carboxymethyl cellulose | | | Inorganic particle slurry | | | | Forced internal short circuit test | |
|---|---|---|---|---|---|---|---|---|---|
| | | | | | Settling | | | The number of | |
| | Etherification degree | Viscosity (mPa·s) | Compounding ratio (%) | Inorganic particles | Viscosity (mPa·s) | property (mm) | Stability (mPa·s) | Dispersion state | burned electrode assemblies | Judgment |
| Example 1 | 0.85 | 1010 | 0.5 | Titanium oxide | 28 | 2 | ≦5 | Good | 0/5 | Good |
| Example 2 | 0.88 | 830 | 0.5 | Titanium oxide | 24 | 2.5 | ≦5 | Good | 0/5 | Good |
| Example 3 | 0.88 | 830 | 1.0 | Titanium oxide | 41 | 2 | ≦5 | Good | 0/5 | Good |
| Example 4 | 1.35 | 1510 | 0.5 | Titanium oxide | 31 | 3 | ≦5 | Good | 0/5 | Good |
| Example 5 | 1.35 | 3150 | 0.3 | Titanium oxide | 38 | 3.5 | ≦5 | Good | 0/5 | Good |
| Example 6 | 0.82 | 6520 | 0.2 | Titanium oxide | 44 | 2.5 | ≦5 | Good | 0/5 | Good |
| Example 7 | 1.35 | 1510 | 0.5 | Aluminum oxide | 28 | 4.5 | ≦5 | Good | 0/5 | Good |
| Example 8 | 1.35 | 1510 | 0.5 | Aluminum oxide | 23 | 3 | ≦5 | Good | 0/5 | Good |
| Example 9 | 1.35 | 1510 | 0.5 | Aluminum oxide | 24 | 4 | ≦5 | Good | 0/5 | Good |
| Comparative Example 1 | 1.00 | 250 | 0.5 | Titanium oxide | 23 | 35 | 35 | Unevenness | 2/5 | Fail |
| Comparative Example 2 | 1.00 | 70 | 0.5 | Titanium oxide | 18 | 36 | 50 | Unevenness | 3/5 | Fail |
| Comparative Example 3 | 0.60 | 1100 | 0.5 | Titanium oxide | 70 | 5 | 45 | Unevenness | 1/5 | Fail |
| Comparative Example 4 | 1.35 | 1510 | 1.2 | Titanium oxide | 88 | 1 | ≦5 | Unevenness | 1/5 | Fail |
| Comparative Example 5 | 1.35 | 1510 | 0.1 | Titanium oxide | 30 | 15 | 70 | Good | 4/5 | Fail |

From the results shown in Table 1, it is revealed that the compounding ratio and physical properties of CMC should be considered when the inorganic particle slurry is prepared in order to form the porous inorganic particle layer. That is, the comparison of Example 4, and Comparative Examples 4 and 5 reveals that the compounding ratio of CMC has an optimum range with respect to inorganic particles, and that, sufficient safety improvement effect can be obtained when the mass ratio is within a range of more than 0.1% and less than 1.2% with respect to the inorganic particles.

of CMC is more preferably 0.2% or more, the comparison of Example 6 and Comparative Example 3 reveals that the etherification degree of CMC is more preferably 0.8 or more, and the comparison of Example 3 and Comparative Example 1 reveals that the viscosity of CMC is preferably 800 mPa·s or more.

The fact that the safety improvement effect was different depending on the difference in the compounding ratio and physical properties of CMC is explained as follows. An inorganic particle slurry used to form the porous inorganic particle layer is desirably in a state in which the inorganic particles are well dispersed and the structural network caused by interaction between the particles is suitably maintained. CMC having a high etherification degree is readily adsorbed to inorganic particles, and has the effect of suppressing the aggregation between particles, thereby contributing to slurry stabilization.

In contrast, when CMC having a low etherification degree is used, CMC is less adsorbed to inorganic particles, interaction between the particles through a binder is increased, an excessively strong structure network is formed, and thus the viscosity is increased. Comparative Example 3 corresponds to the state of increased viscosity. Furthermore, as in Comparative Example 5, when the added amount of CMC is excessively low, the viscosity is similarly increased. Such a slurry that has readily increased viscosity is unstable as a slurry, and thus it becomes difficult to form an even porous inorganic particle layer in long-term production.

Furthermore, as shown in Comparative Examples 1 and 2, when CMC having a low viscosity is used to prepare an inorganic particle slurry, the inorganic particles rapidly settle because the slurry cannot maintain the dispersion state for a long time. When such a slurry readily settles is used, the slurry is also unstable, and thus it becomes difficult to form an even porous inorganic particle layer.

When the amount of CMC is excessive as in Comparative Example 4, the slurry had excessively high viscosity. Thus, even when the slurry has low settling property and sufficient stability, it is difficult to disperse the slurry homogeneously and even coating becomes difficult.

The results of Examples 7 to 9 reveal that even when aluminum oxide was used as the inorganic particles, each result was good in the forced internal short circuit test because a fine porous inorganic particle layer could be obtained as with titanium oxide.

In each example, the porous inorganic particle layer that was formed on the surface of the positive electrode active material layer had a thickness of 1.0 µm. However, because the porous inorganic material layer does not contribute to the electrode reaction, as the thickness becomes thick, the amount of the positive electrode active material capable of being filled is decreased, and thus the battery capacity is readily decreased. Furthermore, when the thickness is excessively thin, the porous inorganic material layer has a smaller effect, and thus the porous inorganic particle layer preferably has a thickness of 0.5 to 3.0 µm.

In each example, $LiCoO_2$ was used as a positive electrode active material. However, generally used conventional lithium transition-metal composite oxides capable of reversibly absorbing and desorbing lithium ions, such as $LiCoO_2$, $LiNiO_2$, $LiNi_xCo_{1-x}O_2$ (x=0.01 to 0.99), $LiMnO_2$, $LiMn_2O_4$, $LiCo_xMn_yNi_zO_2$ (x+y+z=1), and $LiFePO_4$, may be used alone or as a mixture with two or more of these substances.

When the battery is intended to have a high capacity by increasing final charge voltage of the positive electrode potential to 4.4 to 4.6 V based on lithium, a mixture of layered lithium nickel manganese cobalt composite oxide and lithium cobalt oxide containing magnesium, aluminum, and zirconium may be used as the positive electrode active material. As the layered lithium nickel manganese cobalt composite oxide, a mixture of $Li_aMn_sNi_tCo_uM1_vO_2$ (where $0 \leq a \leq 1.2$, $0.1 \leq s \leq 0.5$, $0.1 \leq t \leq 0.5$, M1 is not essential, and when added, is at least one atom selected from Mg, Zr, Al, Ti, and Sn, $u \geq 0$, $0.0001 \leq v \leq 0.03$, and s+t+u+v=1) and $Li_bCo_{1-x-y-z}Zr_xMg_yM2_zO_2$ (where M2 is at least one atom selected form Al, Ti, and Sn, $0 \leq b \leq 1.1$, $x \geq 0.0001$, $y \geq 0.0001$, $z \geq 0$, and $0.0002 \leq x+y+z \leq 0.03$) as a lithium cobalt oxide may be used. Furthermore, the mixing ratio of the layered lithium nickel manganese cobalt composite oxide and the lithium cobalt oxide is layered lithium nickel manganese cobalt composite oxide:lithium cobalt oxide=49:51 to 10:90, and preferably 30:70 to 20:80, as based on the mass ratio.

In each example, graphite was used as a negative electrode active material, but materials capable of reversibly adsorbing and desorbing lithium ions may be used. Examples of the material include carbonaceous materials such as natural graphite, artificial graphite, and coke; alloys and oxides containing silicon, tin, and the like; and mixtures of these substances.

As a nonaqueous solvent (organic solvent) included in the nonaqueous electrolyte, carbonates, lactones, ethers, esters, and the like may be used, and a mixture of two or more of these solvents may be used. Among them, carbonates are preferred.

Specific examples of the solvent include EC and MEC that were used in the examples, as well as propylene carbonate (PC), butylene carbonate (BC), fluoroethylene carbonate (FEC), cyclopentanone, sulfolane, 3-methylsulfolane, 2,4-dimethylsulfolane, 3-methyl-1,3-oxazolidin-2-one, dimethyl carbonate (DMC), diethyl carbonate (DEC), vinylene carbonate (VC), methyl propyl carbonate, methyl butyl carbonate, ethyl propyl carbonate, ethyl butyl carbonate, dipropyl carbonate, γ-butyrolactone, γ-valerolactone, 1,2-dimethoxyethane, tetrahydrofuran, 2-methyltetrahydrofuran, 1,3-dioxolane, methyl acetate, ethyl acetate, and 1,4-dioxane.

As a solute of the nonaqueous electrolyte used in the nonaqueous electrolyte secondary battery of the invention, lithium salts commonly used as a solute in a nonaqueous electrolyte secondary battery may be used. Examples of such lithium salts include $LiPF_6$ used in Examples, as well as $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures of them. The dissolution amount of a solute with respect to the nonaqueous solvent is preferably 0.5 to 2.0 mol/L.

What is claimed is:

1. A method for manufacturing a positive electrode for a nonaqueous electrolyte secondary battery, the method comprising:
    forming a positive electrode active material layer on a surface of a positive electrode collector; and
    coating an inorganic particle slurry containing inorganic particles, carboxymethyl cellulose, and a binder on a surface of the positive electrode active material layer and thereafter drying the slurry to form a porous inorganic particle layer,
    the inorganic particle slurry containing carboxymethyl cellulose having an etherification degree of 0.8 or more and a viscosity of 800 mPa·s or more in a 1% aqueous solution at a ratio of 0.2% by mass or more and 1.0% by mass or less with respect to the inorganic particles.

2. The method for manufacturing a positive electrode for a nonaqueous electrolyte secondary battery according to claim 1, wherein the inorganic particles include an insulating inorganic oxide.

3. The method for manufacturing a positive electrode for a nonaqueous electrolyte secondary battery according to claim 1, wherein the inorganic particles include at least one of titanium oxide and aluminum oxide.

4. The method for manufacturing a positive electrode for a nonaqueous electrolyte secondary battery according to claim 1, wherein the inorganic particle slurry includes a binder at a content of 5% by mass or less with respect to the inorganic particles.

5. The method for manufacturing a positive electrode for a nonaqueous electrolyte secondary battery according to claim 1, wherein the porous inorganic particle layer has a thickness of 0.5 to 3.0 μm.

6. The method for manufacturing a positive electrode for a nonaqueous electrolyte secondary battery according to claim 1, wherein the inorganic particle slurry is coated on the surface of the positive electrode active material layer by a gravure coating method.

7. The method for manufacturing a positive electrode for a nonaqueous electrolyte secondary battery according to claim 1, wherein the forming of the positive electrode active material layer on the surface of the positive electrode collector includes coating a positive electrode active material slurry on the surface of the positive electrode collector and thereafter drying the slurry, the positive electrode active material slurry is a dispersion slurry of a positive electrode active material in a nonaqueous solvent, and the inorganic particle slurry is a dispersion slurry of the inorganic particles in water.

* * * * *